(12) United States Patent
Shimizu

(10) Patent No.: US 8,704,911 B2
(45) Date of Patent: Apr. 22, 2014

(54) IMAGE PROCESSING APPARATUS, IMAGE PROCESSING METHOD, AND RECORDING MEDIUM

(75) Inventor: Yusuke Shimizu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 40 days.

(21) Appl. No.: 13/221,390

(22) Filed: Aug. 30, 2011

(65) Prior Publication Data

US 2012/0057044 A1    Mar. 8, 2012

(30) Foreign Application Priority Data

Sep. 2, 2010    (JP) .................................. 2010-196643

(51) Int. Cl.
*H04N 9/73*    (2006.01)
*H04N 5/222*    (2006.01)

(52) U.S. Cl.
USPC ..................................... 348/223.1; 348/371

(58) Field of Classification Search
USPC ................. 348/223.1, 224.1, 227.1, 370, 371
See application file for complete search history.

(56) References Cited

U.S. PATENT DOCUMENTS

| | | | |
|---|---|---|---|
| 2005/0195290 A1* | 9/2005 | Takeshita | 348/223.1 |
| 2007/0024742 A1* | 2/2007 | Raskar et al. | 348/370 |
| 2007/0165960 A1* | 7/2007 | Yamada | 382/254 |
| 2007/0201853 A1* | 8/2007 | Petschnigg | 396/155 |
| 2008/0094484 A1* | 4/2008 | Wu | 348/223.1 |
| 2009/0002519 A1* | 1/2009 | Nakamura | 348/223.1 |
| 2010/0045848 A1* | 2/2010 | Sugimoto et al. | 348/347 |
| 2010/0149374 A1* | 6/2010 | Takahashi et al. | 348/223.1 |

FOREIGN PATENT DOCUMENTS

| | | |
|---|---|---|
| CN | 1846447 A | 10/2006 |
| CN | 101159879 A | 4/2008 |
| CN | 101179663 A | 5/2008 |
| JP | 2001/358986 A | 12/2001 |
| JP | 2006-173438 A | 6/2003 |
| JP | 3540485 B2 | 7/2004 |
| JP | 2009-033289 A | 2/2009 |
| JP | 2009-060586 A | 3/2009 |
| JP | 2009-094997 A | 4/2009 |
| WO | 2004/010711 A | 1/2004 |
| WO | 2004/010711 A1 | 1/2004 |

* cited by examiner

*Primary Examiner* — Aung S Moe
*Assistant Examiner* — Amy Hsu
(74) *Attorney, Agent, or Firm* — Canon U.S.A., Inc., IP Division

(57) ABSTRACT

An image processing method generates first developed image data by correcting first image data with use of a white balance correction value corresponding to flash light, generates second developed image data by correcting the first image data with use of a second white balance correction value corresponding to external light, calculates a combining ratio of each block based on a flash component and an external light component of each of blocks into which the first image data is divided, and combines the first developed image data and the second developed image data according to the calculated combining ratio.

12 Claims, 9 Drawing Sheets

IMAGE PROCESSING APPARATUS, IMAGE PROCESSING METHOD, AND RECORDING MEDIUM

BACKGROUND OF THE INVENTION

1. Field of the Invention

The present invention relates to a white balance correction of an image captured by an imaging apparatus.

2. Description of the Related Art

Generally, imaging apparatuses using an image sensor such as a digital camera and a digital video camera are provided with the white balance control function for adjusting a color tone of an image captured by an imaging operation. This white balance control includes manual white balance control which acquires a white balance coefficient by imaging a white object in advance and applies the calculated white balance coefficient to the entire screen. Further, the white balance control includes automatic white balance control which automatically detects a possible white portion from a captured image, calculates a white balance coefficient from an average value of each color component in the entire screen, and applies the calculated white balance coefficient to the entire screen.

Now, a conventional method of the automatic white balance control will be described. An analog signal output from an image sensor is converted into a digital signal by analog/digital (A/D) conversion, and is divided into a plurality of blocks as illustrated in FIG. 3. Each of the blocks is constituted by red (R), green (G), and blue (B) color pixels, and a color evaluation value ($Cx[i]$, $Cy[i]$) is calculated for each block by, for example, the following equation (1).

$$Cx[i] = (R[i] - B[i])/Y[i] \times 1024$$

$$Cy[i] = (R[i] + B[i] - 2G[i])/Y[i] \times 1024 \quad \text{[EQUATION 1]}$$

(In this equation, i represents a block number, $R[i]$, $G[i]$, and $B[i]$ each represent an average value of RGB pixels included in the block i, and $Y[i] = (R[i] + 2G[i] + B[i])/4$.

Then, if the calculated color evaluation value ($Cx[i]$, $Cy[i]$) falls within a preset white detection range, that block is determined as a white block. Then, the summation value (SumR, SumG, SumB) of the color pixels included in such blocks is calculated, and the white balance coefficient (WBCo_R, WBCo_G, WBCo_B) is calculated by the following equation (2).

$$WBCo\_R = SumY \times 1024/sumR$$

$$WBCo\_G = SumY \times 1024/sumG$$

$$WBCo\_B = SumY \times 1024/sumB \quad \text{[EQUATION 2]}$$

(In this equation, $SumY = (sumR + 2 \times sumG + sumB)/4$.)

However, such automatic white balance control has the following problem; in a scene that an imaging apparatus captures an image while emitting flash light, even when there is a light source different from the flash light in the image, the imaging apparatus performs the white balance control by applying the white balance coefficient calculated as mentioned above to the entire screen. Therefore, it is difficult to perform the white balance control so as to achieve appropriate color tints for both the light sources. For example, in a scene that an imaging apparatus emits flash light which is a light source having a high color temperature, if the ambient light contains a low color temperature light source such as a light bulb color source, controlling the white balance based on the flash light results in unsuitable white balance for the low color temperature light source in the ambient light. On the other hand, controlling the white balance based on the low color temperature light source in the ambient light results in unsuitable white balance for the flash light. Further, even if the imaging apparatus performs the white balance control by adjusting the white balance to the middle between the respective light sources, this results in unsuitable white balance for both of the light sources, leading to generation of an image in which a region irradiated with the flash light is tinged with blue while a region irradiated with the low color temperature light source is tinged with red.

Therefore, to solve this problem, for example, the technique discussed in Japanese Patent No. 3540485 calculates a data ratio by comparing an image captured with the flash on to an image captured with the flash off for each arbitrary object region, and determines a degree of contribution of the flash light based on the calculated ratio value. This technique performs the white balance control by selecting a white balance control value for each region for video data captured in an exposure with the flash light, according to the degree of contribution.

However, the conventional technique discussed in Japanese Patent No. 3540485 performs a development process after varying the white balance control value for each region, whereby other control such as color reproduction may become inappropriate to the white balance control value. As a result, the conventional technique cannot fully reproduce an appropriate tint.

SUMMARY OF THE INVENTION

The present invention is directed to generation of an image achieving an appropriate tint, even in such a scene that flash light is emitted.

According to an aspect of the present invention, an image processing apparatus includes a correction unit configured to generate, from first image data captured while the flash light is emitted, first developed image data by correcting with use of a first white balance correction value corresponding to flash light, and second developed image data by correcting with use of a second white balance correction value corresponding to external light, a division unit configured to divide the first image data into a plurality of blocks, a combining ratio calculation unit configured to calculate a flash component and an external light component of each of the blocks divided by the division unit from a luminance value of the first image data and a luminance value of second image data captured while flash light is not emitted, and calculate a combining ratio for each of the blocks based on the calculated flash component and external light component of each of the blocks, and a combining unit configured to combine the first developed image data and the second developed image data generated by the correction unit according to said combining ratio.

Aspects of the invention may also provide a computer program and a computer program product for carrying out any of the methods described herein and/or for embodying any of the apparatus features described herein, and a computer readable medium having stored thereon a program for carrying out any of the methods described herein and/or for embodying any of the apparatus features described herein. Aspects of the invention may extend to methods, apparatus and/or use substantially as herein described with reference to the accompanying drawings. Any feature in one aspect of the invention may be applied to other aspects of the invention, in any appropriate combination. In particular, features of method aspects may be applied to apparatus aspects, and vice versa. Furthermore, features implemented in hardware may generally be implemented in software, and vice versa. Any reference to software and hardware features herein should be construed accordingly. Further preferred features and aspects of the present invention will now be described by way of example with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
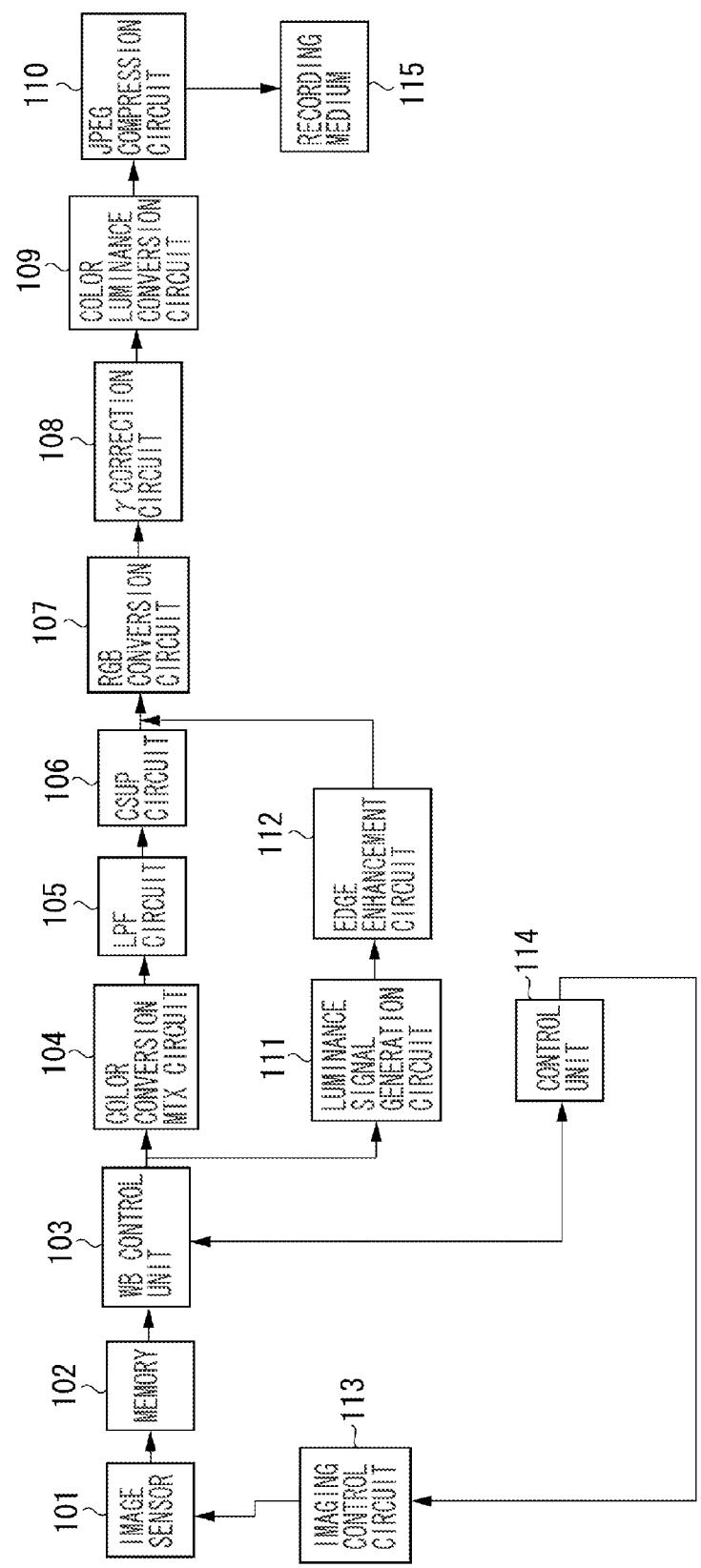
FIG. 1 is a block diagram illustrating an example of a configuration of a digital camera according to an exemplary embodiment of the present invention.

Hereinafter, an exemplary embodiment of a useful image processing apparatus of the present invention will be described in detail with reference to the accompanying drawings. FIG. 1 is a block diagram illustrating an example of a configuration of a digital camera 100 according to the present exemplary embodiment. Referring to FIG. 1, a solid image sensor 101 is an image sensor constituted by, for example, a charge coupled device (CCD) or a complementary metal oxide semiconductor (CMOS). The surface of the solid image sensor 101 is covered with, for example, an RGB color filter such as the Bayer array so as to be configured to be capable of color photography. When an object image is formed on the solid image sensor 101, the solid image sensor 101 generates image data (image signal) which is then stored in a memory 102.

A control unit 114 calculates such a shutter speed and a diaphragm value that an entire image is lighted up, and calculates a drive amount of a focus lens so as to focus on an object located within a focusing region. Then, the information calculated by the control unit 14, i.e., the exposure value (the shutter speed and the diaphragm value) and the drive amount of the focus lens are transmitted to an imaging control circuit 113, and the corresponding units and parts are controlled according to the respective values. A white balance (WB) control unit 103 calculates a WB correction value based on the image signal stored in the memory 102, and applies a WB correction to the image signal stored in the memory 102 with use of the calculated WB correction value. The details of the configuration of the WB control unit 103 and the method for calculating the WB correction value will be described later.

A color conversion matrix circuit 104 converts the image signal, to which the WB control unit 103 has applied the WB correction, into a color-difference signal R-Y/B-Y by multiplying the image signal by a color gain so that the image signal can be reproduced by an optimal color. A low path filter (LPF) circuit 105 is a circuit to limit the band of the color-difference signal R-Y/B-Y. A chroma suppress (CSUP) circuit 106 is a circuit to remove a false color signal of a saturated portion of the image signals of the band limited by the LPF circuit 105.

On the other hand, the image signal to which the WB control unit 103 has applied the WB correction is also output to a luminance signal generation circuit 111. The luminance signal generation circuit 111 generates a luminance signal Y from the input image signal. An edge enhancement circuit 112 applies the edge enhancement processing to the generated luminance signal Y.

An RGB conversion circuit 107 converts the color difference signal R-Y/B-Y output from the CSUP circuit 106 and the luminance signal Y output from the edge enhancement circuit 112 into an RGB signal. A gamma correction circuit 108 applies a gradation correction to the converted RGB signal. After that, a color luminance conversion circuit 109 converts the RGB signal with the corrected gradation into a YUV signal. Further, a Joint Photographic Experts Group (JPEG) compression circuit 110 compresses the converted YUV signal by, for example, the JPEG method, and stores the compressed data in an external or internal recording medium 115 as an image signal.

Figure 5:
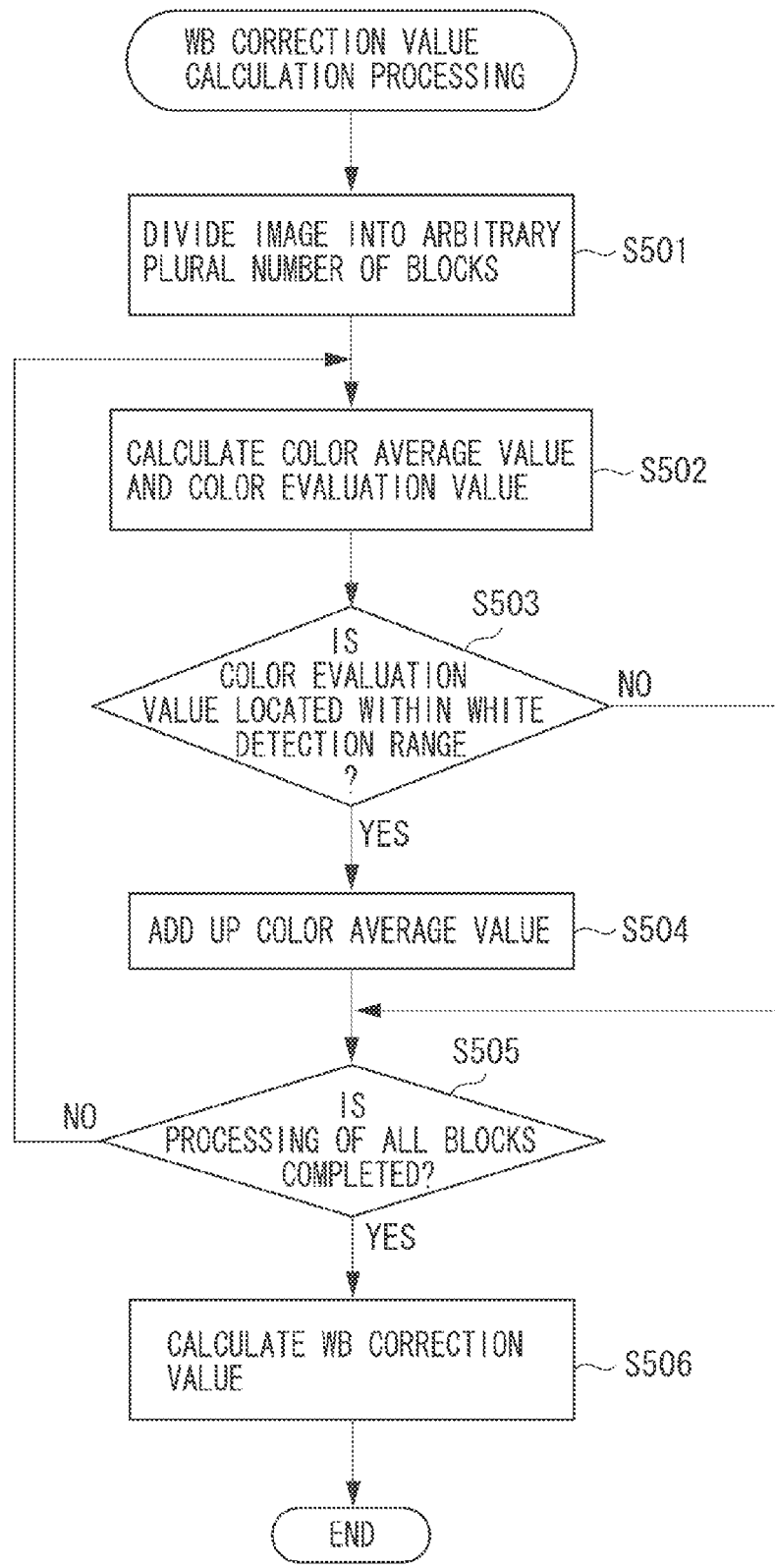
FIG. 5 is a flowchart illustrating an example of processing for determining a first WB correction value.

Next, the method in which the WB control unit 103 calculates the WB correction value will be described in detail. FIG. 5 is a flowchart illustrating an example of a processing procedure that the WB control unit 103 performs to calculate a first white balance correction value (first WB correction value) for an image captured while flash light is emitted. As will be used herein, the first WB correction value refers to a correction value calculated by the white balance control corresponding to the flash light.

First, in step S501, the WB control unit 103 reads out an image signal (first image data) stored in the memory 102, and divides the screen of the image into an arbitrary number m of blocks. Then, in step S502, for each of the m blocks, the WB control unit 103 averages the pixel values for each color to calculate a color average value (R[i], G[i], B[i]). Then, the WB control unit 103 further calculates a color evaluation value (Cx[i], Cy[i]) with use of the following equation (3).

$$Cx[i]=(R[i]-B[i])/Y[i]\times 1024$$

$$Cy[i]=(R[i]+B[i]-2G[i])/Y[i]\times 1024 \qquad [\text{EQUATION 3}]$$

(In this equation, $Y[i]=(R[i]+2G[i]+B[i])/4$.)

Subsequently, in step S503, the WB control unit 103 performs white detection to determine whether the color evaluation value is within a white detection range. Now, the method of the white detection will be described.

Figure 4A:
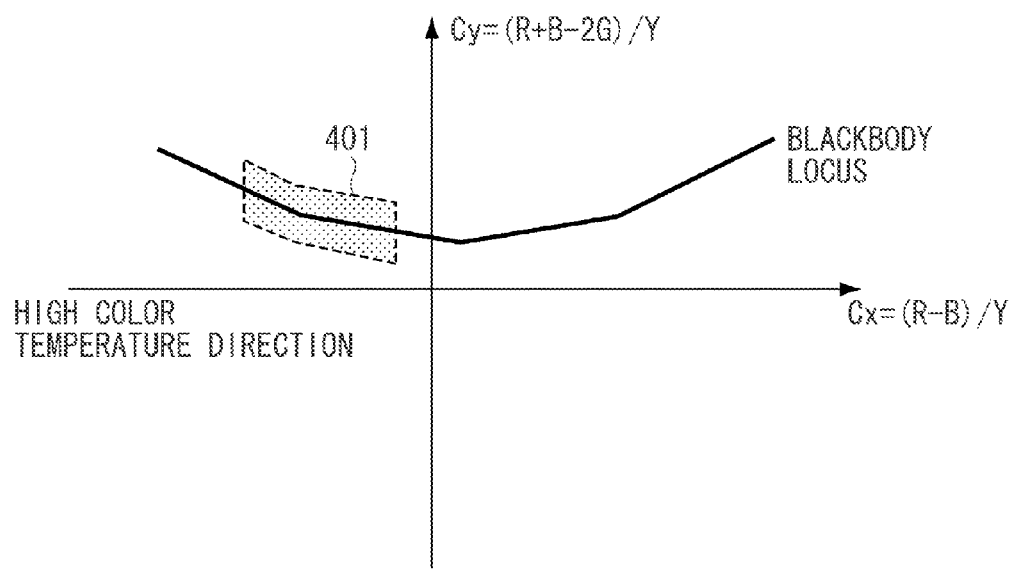
FIGS. 4A and 4B are characteristic charts each illustrating an example of the relationship of a color evaluation value for use in white detection.
Figure 4B:
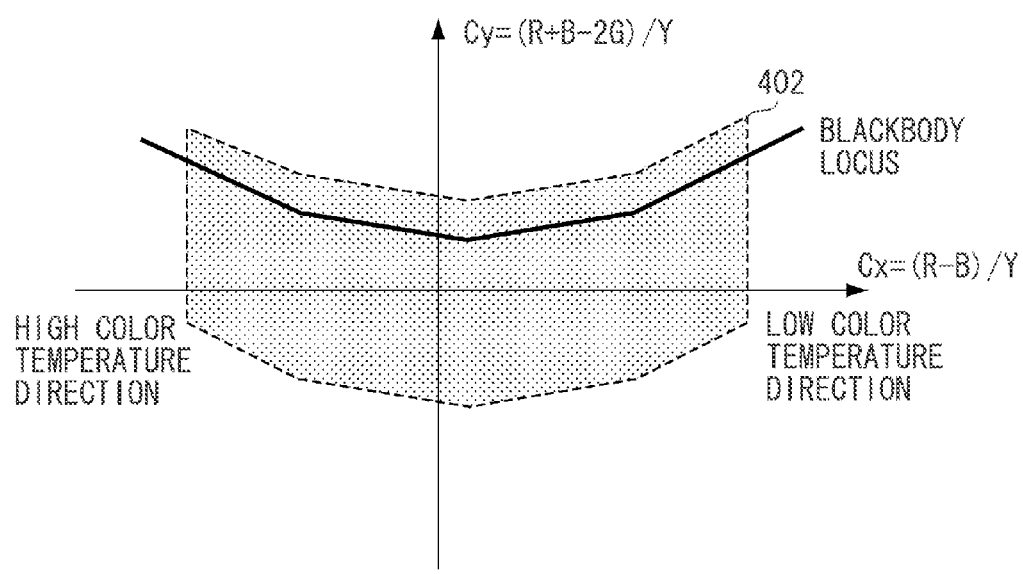

FIGS. 4A and 4B are characteristic charts each indicating the relationship of the color evaluation value for use in the white detection. In FIG. 4A, the negative direction of the x axis (Cx) represents the color evaluation value when white of a high color temperature object is imaged, while the positive direction of the x axis represents the color evaluation value when white of a low color temperature object is imaged.

Further, the y coordinate (Cy) represents a degree of the green component of a light source. As the value is increased in the negative direction of the y axis, the green component is increased, which indicates that the light source is a fluorescent bulb. In step S503, the WB control unit 103 determines whether the color evaluation value (Cx[i], Cy[i]) of the i-th block calculated in step S502 is located within a preset white detection range 401 illustrated in FIG. 4A.

The white detection range 401 illustrated in FIG. 4A is a limited detection range since this is to detect white under the light source of the flash light. If the calculated color evaluation value (Cx[i], Cy[i]) is located within this white detection range 401 (YES in step S503), the WB control unit 103 determines that this block is white. Then, in step S504, the WB control unit 103 adds the color average value (R[i], G[i], B[i]) of that block. On the other hand, if the calculated color evaluation value is not located within the white detection range 401 (NO in step S503), the processing proceeds to step S505 without adding the color average value of that block. In this calculation in step S504, the WB control unit 103 adds up the color average values (R[i], G[i], B[i]) with use of the following equation (4).

$$SumR1 = \sum_{i=0}^{m} Sw[i] \times R[i]$$

$$SumG1 = \sum_{i=0}^{m} Sw[i] \times G[i]$$

$$SumB1 = \sum_{i=0}^{m} Sw[i] \times B[i]$$

[EQUATION 4]

In this equation (4), Sw[i] is set to 1 if the color evaluation value (Cx[i], Cy[i]) is located within the white detection range 401, while Sw[i] is set to 0 if the color evaluation value (Cx[i], Cy [i]) is not located within the white detection range 401. Setting Sw[i] in this way enables the WB control unit 103 to perform or skip the addition of the color average value (R[i], G[i], B[i]).

Subsequently, in step S505, the WB control unit 103 determines whether the WB control unit 103 has decided whether the color evaluation value is located within the color detection range 401 for all of the blocks. As a result of the determination in step S505, if there is any block left to be processed (NO in step S505), the processing returns to step S502. If all of the blocks are processed (YES in step S505), the processing proceeds to the next step, step S506. In this way, when the WB control unit 103 has finished the processing for all of the blocks, the summation value (SumR1, SumG1, SumB1) in the equation (4) is determined.

Subsequently, in step S506, the WB control unit 103 calculates a first WB correction value (WBCol_R1, WBCol_G1, WBCol_B1) from the determined summation value (SumR1, SumG1, SumB1) of the color average values with use of the following equation (5).

$WBCo\_R1 = sumY1 \times 1024/sumR1$ $WBCo\_G1 = sumY1 \times 1024/sumG1$ $WBCo\_B1 = sumY1 \times 1024/sumB1$  (EQUATION 5)

(In this equation, sumY1=(sumR1+2×sumG1+sumB1)/4.)

Alternatively, a first WB correction value for the flash light may be set in advance as a known value.

Figure 6:
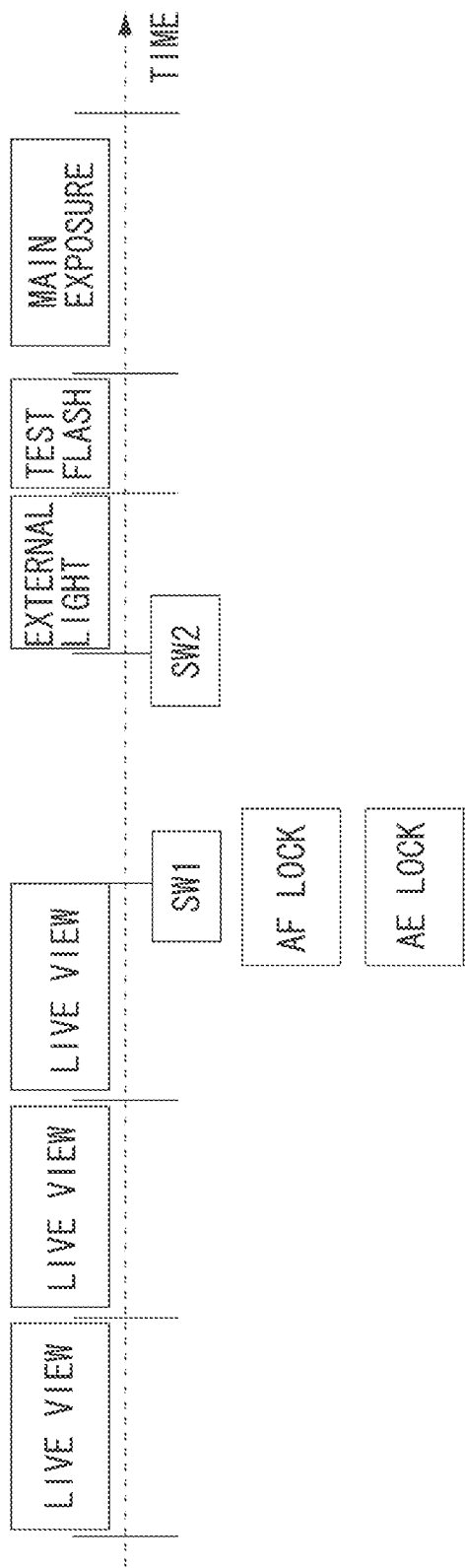
FIG. 6 illustrates image capturing control arranged in chronological order.

Next, the method for calculating a second white balance correction value (second WB correction value) will be described. The second WB correction value is calculated from image data (second image data) captured while the flash light is not emitted. FIG. 6 illustrates image capturing control arranged in chronological order. Referring to FIG. 6, the digital camera 100 periodically captures a live view image before the shutter button is half-pressed (this state is hereinafter referred to as "SW1"). When the digital camera 100 is set into the SW1 state, the digital camera 100 starts the automatic focus (AF) lock and the automatic exposure (AE) lock. Further, when the shutter button is fully pressed (this state is hereinafter referred to as "SW2"), the digital camera 100 emits the flash light as a test flash and then proceeds to a main exposure. In the present exemplary embodiment, the image data captured while the flash light is not emitted corresponds to the image data exposed to light during the period indicated by "EXTERNAL LIGHT" in FIG. 6, which is captured before the test flash. Alternatively, the image data captured while the flash light is not emitted may be image data exposed to light and captured after the main exposure.

The method for calculating the second WB correction value is performed by the WB control unit 103 similar to the above-described method for calculating the first WB correction value. A difference from the calculation of the first WB correction value is use of a white detection range for the external light, as indicated by a white detection range 402 illustrated in FIG. 4B. This is because the flash light is a known light source, while the external light is an unknown light source, whereby it is impossible to set a limitation to the white detection range corresponding to the external light like the setting of the limitation to the white detection range 401 corresponding to emission of the flash light.

Figure 7:
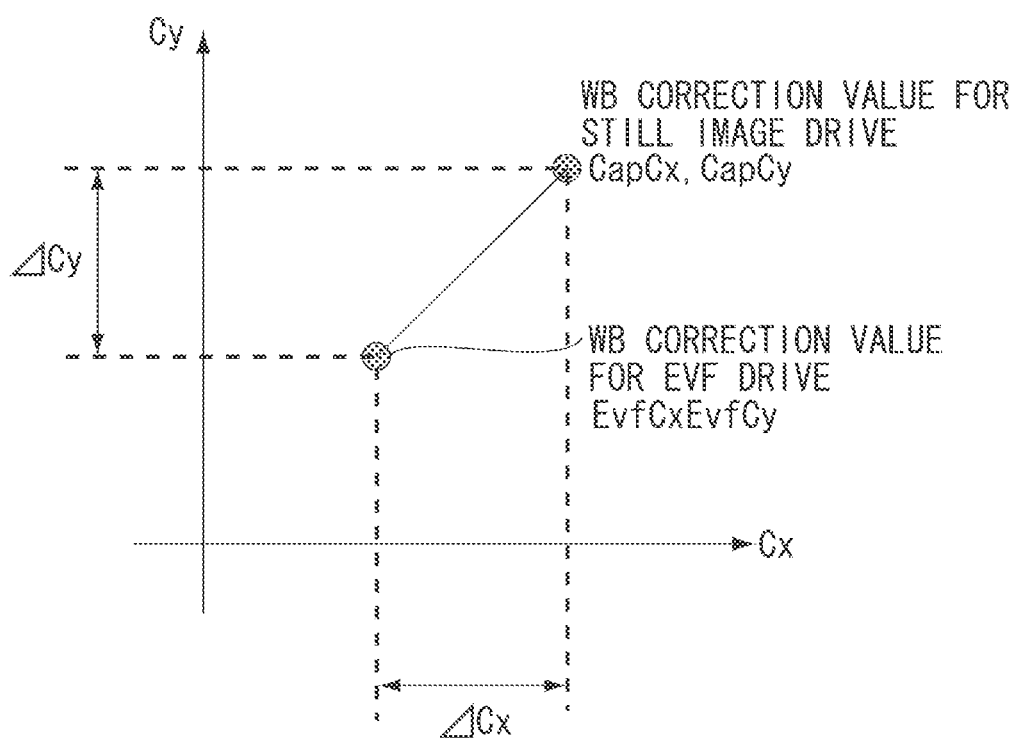
FIG. 7 is a characteristic chart illustrating the relationship of the color evaluation value when a spectral difference is generated depending on a drive mode.

The white detection range 402 illustrated in FIG. 4B is defined by shooting white under difference light sources in advance and plotting calculated color evaluation values along a blackbody locus. This white detection range 402 can be set so as to have a different range depending on a shooting mode. The second WB correction value can be applied to even a different imaging drive mode. For example, the WB correction value for Electronic View Finder (EVF) calculated in the past may be used as the second WB correction value. However, in a case where a spectral difference is generated depending on the drive mode, the Cx and Cy are corrected by ΔCx and ΔCy as illustrated in FIG. 7, and then the second WB correction value is calculated.

Figure 9:
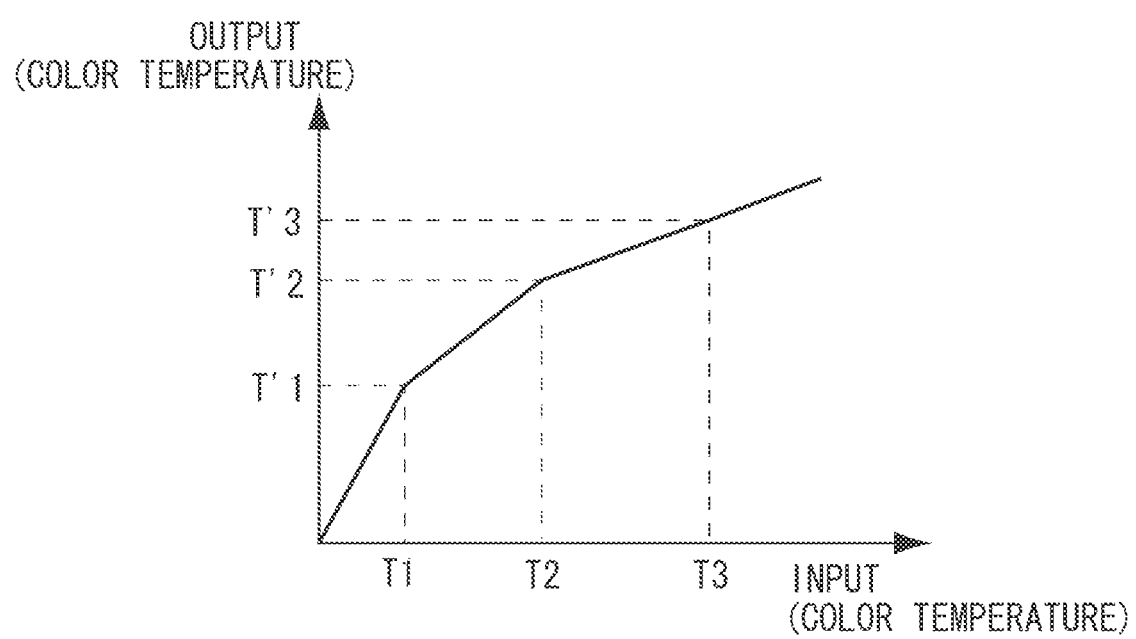
FIG. 9 is a characteristic chart illustrating the relationship between an input and an output in a case of a light source having a low color temperature.

Further, if the background is irradiated with a low color temperature light source such as a light bulb color source, the second WB correction value may be calculated so as to maintain the tint to preserve the mood of the scene. For example, the relationship of color temperatures is set so that an input image is output as an image having a different color temperature, as the relationship illustrated in FIG. 9. In this way, if the white balance is controlled so as to maintain the tint when the color temperature of the second WB correction value is low, for example, an image retaining a tinge of red of the light bulb color source can be generated.

Figure 2:
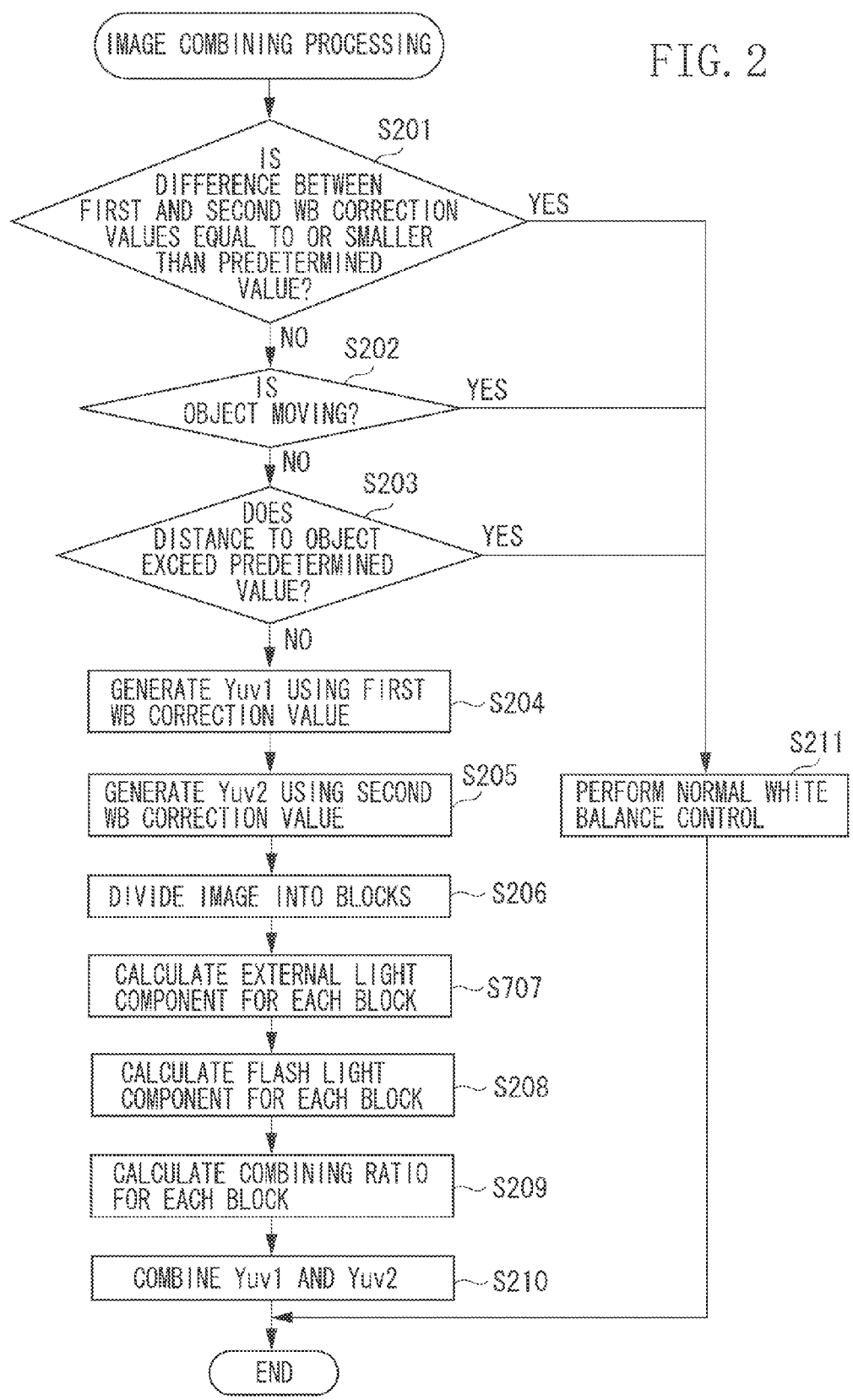
FIG. 2 is a flowchart illustrating an example of processing for combining two images.
Figure 3:
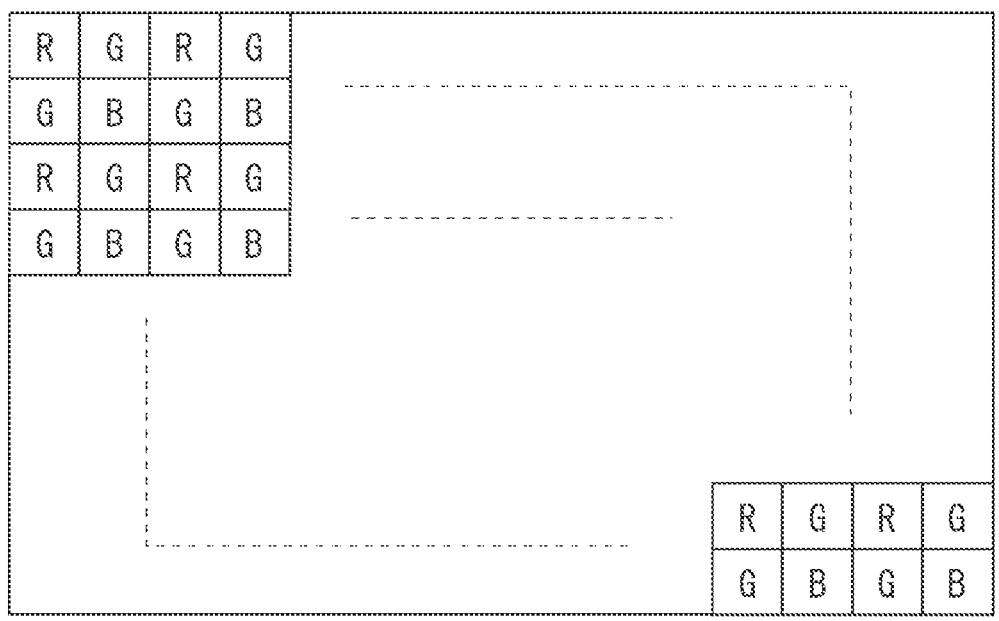
FIG. 3 illustrates blocks each constituted by R, G, and B color pixels.

Next, image combining processing will be described with reference to the flowchart illustrated in FIG. 2. FIG. 2 is a flowchart illustrating an example of processing that the WB control unit 103 performs to combine images. First, in step S201, the WB control unit 103 determines whether the difference between the first WB correction value and the second WB correction value calculated by the procedure illustrated in FIG. 5 is equal to or smaller than a predetermined value. As a result of this determination, if the difference is equal to or smaller than the predetermined value (YES in step S201), the WB control unit 103 does not perform the image combining processing. Then, in step S211, the WB control unit 103 performs normal white balance control. The normal white balance control will be described later.

On the other hand, as a result of the determination in step S201, if the difference exceeds the predetermined value (NO in step S201), the processing proceeds to step S202 in which the WB control unit 103 determines whether the object is moving. At this time, the WB control unit 103 detects the object by a known technique, and determines whether the object is moving by comparing image data captured while the flash light is emitted, to image data captured while the flash light is not emitted, and calculating whether a difference therebetween is equal to or larger than a predetermined amount. As a result of this determination, if the object is moving (YES in step S202), the processing proceeds to step S211.

On the other hand, as a result of the determination in step S202, if the object is not moving (NO in step S202), the processing proceeds to step S203 in which the WB control unit 103 determines whether the distance between the digital camera 100 and the object exceeds a predetermined value. At this time, as the distance to the object, the WB control unit 103 may use the focal length, or may use a value previously input as the distance to the object as it is. As a result of this determination, if the distance exceeds the predetermined value (YES in step S203), the processing proceeds to step S211. On the other hand, as a result of the determination in step S203, if the distance is equal to or smaller than the predetermined value (NO in step S203), the processing proceeds to step S204 to perform the image combining processing.

Subsequently, in step S204, the WB control unit 103 applies the white balance correction with use of the above-described first WB correction value to the image signal (first image data) stored in the memory 102, and generates a developed image signal Yuv1 as first developed image data. Then, in step S205, similarly, the WB control unit 103 applies the white balance correction with use of the above-described second WB correction value to the first image data, and generates a developed image signal Yuv2 as second developed image data. Next, in step S206, the WB control unit 103 divides each of the image signals (the image captured while the flash light is emitted, and the image captured while the flash light is not emitted) stored in the memory 102, the developed image signal Yuv1, and the developed image signal Yuv2 into n blocks.

Subsequently, in step S207, the WB control unit 103 averages the pixel values for each color to calculate a color average value $(R1[i], G1[i], B1[i])$ for each of the blocks in the image captured while the flash light is not emitted, which is stored in the memory 102. Then, the WB control unit 103 calculates a luminance value $a[i]$ of each block with use of the following equation (6). At this time, the luminance value $a[i]$ of each block calculated in this way is set as an external light component of each block.

$$a[i]=0.3 \times R2[i]+0.6 \times G2[i]+0.1 \times B2[i] \quad \text{(EQUATION 6)}$$

Subsequently, in step S208, the WB control unit 103 averages the pixel values for each color to calculate a color average value $(R1[i], G1[i], B1[i])$ for each of the blocks in the image captured while the flash light is emitted during the main exposure, in a similar manner to the calculation of the luminance value $a[i]$. Then, the WB control unit 103 calculates a luminance value $b[i]$ of each block with use of the following equation (7).

$$b[i]=0.3 \times R1[i]+0.6 \times G1[i]+0.1 \times B2[i] \quad \text{(EQUATION 7)}$$

Then, the WB control unit 103 further calculates a flash component $c[i]$ of each block by subtracting, from the calculated luminance value $b[i]$ of each block, the luminance value $a[i]$ of the corresponding block in the image captured while the flash light is not emitted.

Subsequently, in step S209, the WB control unit 103 calculates the ratio of the flash component $c[i]$ to the external light component $a[i]$ for each block by comparing the flash component $c[i]$ and the external light component $a[i]$ corresponding to each other. Then, the WB control unit 103 calculates a combining ratio $\alpha[i]$ for each block, which is used in combining the developed image signal Yuv1 and the developed image signal Yuv2, with use of the following equation (8).

$$\alpha[i] = \frac{c[i]}{a[i]+c[i]} \quad \text{(EQUATION 8)}$$

Subsequently, in step S210, the WB control unit 103 combines the developed image signal Yuv1 and the developed image signal Yuv2 according to the combining ratio $\alpha[i]$ of each block to generate a combined image signal Yuv3. A color evaluation value $(Y1[i], u1[i], v1[i])$ of the combined image signal Yuv3 is calculated with use of a color evaluation value $(Y1[i], u1[i], v1[i])$ of the developed image signal Yuv1 and a color evaluation value $(Y1[i], u1[i], v1[i])$ of the developed image signal Yuv2. More specifically, the color evaluation value $(Y1[i], u1[i], v1[i])$ of the combined image signal Yuv3 is calculated by the following equation (9).

$$Y3[i]=Y1[i] \times \alpha[i]+Y2[i] \times (1-\alpha[i])$$

$$u3[i]=u1[i] \times \alpha[i]+u2[i] \times (1-\alpha[i])$$

$$v3[i]=v1[i] \times \alpha[i]+v2[i] \times (1-\alpha[i]) \quad \text{(EQUATION 9)}$$

At this time, the WB control unit 103 may further perform pixel interpolation processing in step S209 to calculate a combining ratio $\alpha'[j]$ of each pixel from the combining ratio $\alpha[i]$ of each block, so as to reduce a tint variation that may be generated at a boundary between blocks. For example, the WB control unit 103 calculates the combining ratio $\alpha'[j]$ of each pixel from the combining ratio $\alpha[i]$ of each block with use of bilinear interpolation as the pixel interpolation processing. At this time, in step S210, the combined image signal Yuv3 is generated by combining the developed image signal Yuv1 and the developed image signal Yuv2 with use of the combining ratio $\alpha'[j]$ of each pixel. A color evaluation value $(Y1[j], u1[j], v1[j])$ of the combined image signal Yuv3 is calculated with use of a color evaluation value $(Y1[j], u1[j], v1[j])$ of the developed image signal Yuv1 and a color evaluation value $(Y1[j], u1[j], v1[j])$ of the developed image signal Yuv2. More specifically, the color evaluation value $(Y1[j], u1[j], v1[j])$ of the combined image signal Yuv3 is calculated by the following equation (10).

$$Y3[j]=Y1[j] \times \alpha'[j]+Y2[j] \times (1-\alpha'[j])$$

$$u3[j]=u1[j] \times \alpha'[j]+u2[j] \times (1-\alpha'[j])$$

$$v3[j]=v1[j] \times \alpha'[j]+u2[j] \times (1-\alpha'[j]) \quad \text{(EQUATION 10)}$$

Further, in step S210, the WB control unit 103 may change the processing for each block by determining whether to perform the image combining processing for each block according to the luminance value of each block in the image captured while the flash light is emitted during the main exposure. In this case, if the block that is currently being processed has a low luminance value or a high luminance value, the WB control unit 103 does not apply the image combining processing to this block, and instead performs development processing with use of a WB correction value calculated by the normal white balance control which will be described later. On the other hand, if the block that is currently being processed has a luminance value other than the above values, the WB control unit 103 applies the same processing as the above-described image combining processing to this block.

Next, the normal white balance control performed in step S211 will be described in detail. First, the WB control unit 103 calculates the first WB control value and the second WB control value in the same manner as the calculation of the WB correction value illustrated in FIG. 5. Then, the WB control unit 103 performs a weighted summation of the first WB correction value and the second WB correction value. This weighted summation is performed based on a projection ratio of the external light to the flash light projected to the object.

Figure 8:
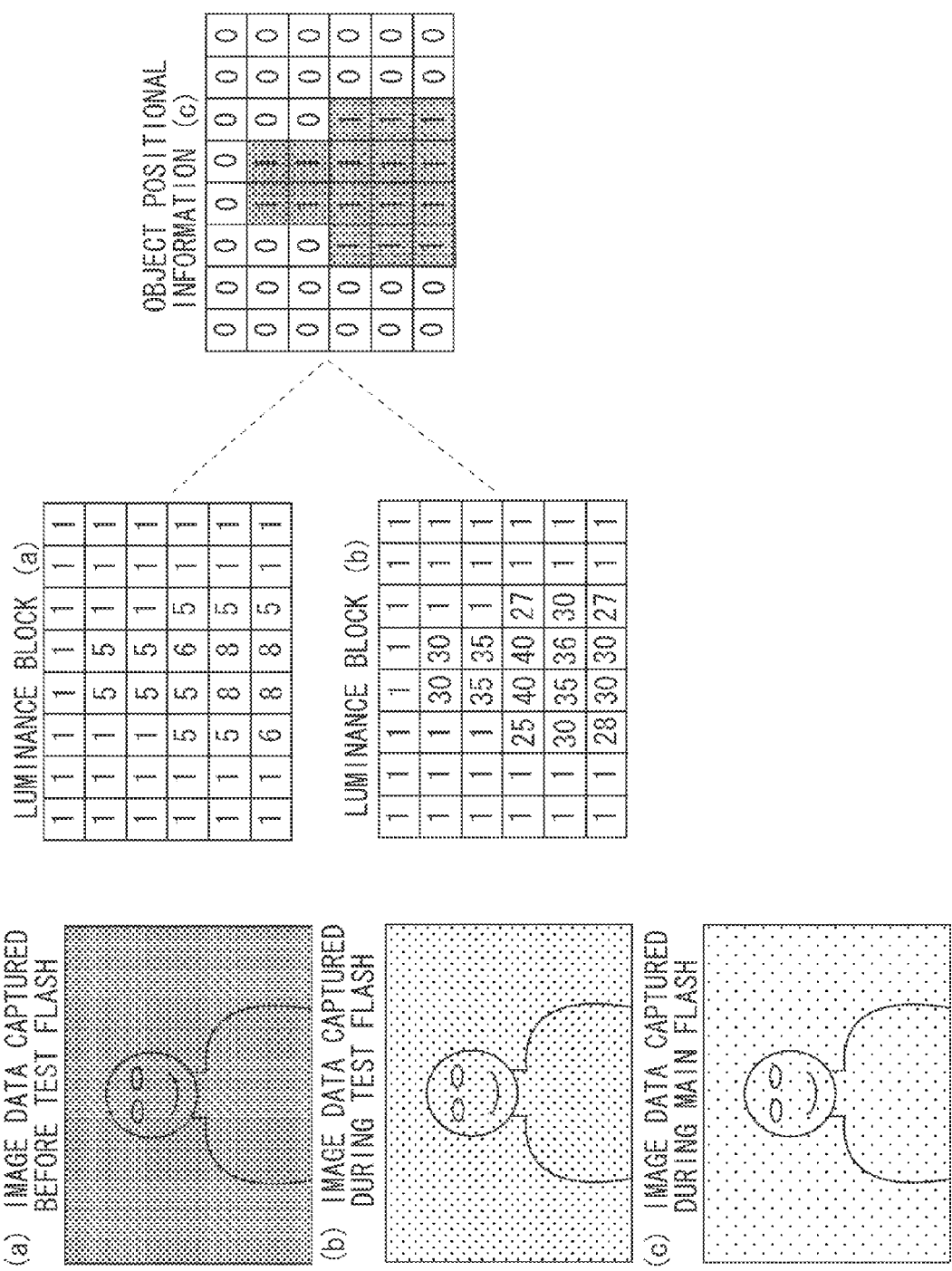
FIG. 8 illustrates an example of a difference between luminance before flash light is emitted and luminance after the flash light is emitted.

Now, the method for calculating the projection ratio will be described. First, as illustrated in FIG. 8, the WB control unit 103 acquires image data before the flash light is emitted as a test flash, and calculates a luminance block a constituted by an (m×n) matrix from the image data captured before the test flash. After that, the flash light is emitted as the test flash in the timing indicated in FIG. 6, and the WB control unit 103 acquires image data generated during this test flash. Then, the WB control unit 103 also calculates a luminance block b constituted by an (m×n) matrix under the same condition as the condition for the image captured before the test flash. These luminance blocks a and b are temporarily stored in, for example, the memory 102 of the digital camera 100.

Further, it is assumed that the background of the object is substantially unchanged between the image data before the test flash and the image data during the test flash.

Therefore, difference data between the luminance block a and the luminance block b indicates the light reflected on an object region when the flash light is emitted as the test flash, and thereby object positional information c can be acquired from this difference data.

The WB control unit 103 acquires a block corresponding to the position of the object from the thus-calculated object positional information c, and calculates luminance Y1 during the main exposure and luminance Y2 while the flash light is not emitted at the acquired block. At this time, if the exposure condition at the time of the main exposure is different from the exposure condition when the flash light is not emitted, the WB control unit 103 calculates the luminance Y1 and the luminance Y2 after evening out the exposure conditions. The WB control unit 103 sets the ratio of the thus-calculated luminance Y1 to luminance Y2 as the ratio of the light amounts (mixture ratio) projected to the object, and calculates a third white balance correction value by performing a weighted summation of the first WB correction value and the second WB correction value according to this mixture ratio. The WB control unit 103 determines the third WB correction value acquired in this way as a WB correction value that the WB control unit 103 uses in the WB processing, and makes development and generates final developed image data (third developed image data).

Further, the above-described image combining processing employs the Yuv format for the developed image signal, but may employ, for example, the RGB format as the image format. In this case, the equation (9) used in step S210 contains a color evaluation value (R[i], G[i], B[i]) instead of the color evaluation value (Y[i], u[i], v[i]), and the WB control unit 103 calculates a color evaluation value (R1[i], G1[i], B1[i]) of a combined image signal RGB3.

In this way, according to the present exemplary embodiment, the WB control unit 103 combines the image which undergoes the WB processing corresponding to the flash light, and the image which undergoes the WB processing corresponding to the external light based on the combining ratio of each block. As a result, it is possible to generate an image with the main object and the background both tinted with appropriate colors to thereby provide a user with the preferable image, even in a scene that the flash light is emitted.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-196643 filed Sep. 2, 2010, which is hereby incorporated by reference herein in its entirety.

What is claimed is:

1. An image processing apparatus comprising:
  correction unit configured to generate, from first image data captured while the flash light is emitted, first developed image data by correcting the first image data with use of a first white balance correction value corresponding to flash light, and second developed image data by correcting the first image data with use of a second white balance correction value corresponding to external light;
  division unit configured to divide the first image data into a plurality of blocks;
  combining ratio calculation unit configured to calculate a flash component and an external light component of each of the blocks divided by the division unit from a luminance value of the first image data and a luminance value of second image data captured while flash light is not emitted, and calculate a combining ratio for each of the blocks based on the calculated flash component and external light component of each of the blocks; and
  combining unit configured to combine the first developed image data and the second developed image data generated by the correction unit according to said combining ratio.

2. The image processing apparatus according to claim 1, further comprising:
  first calculation unit configured to calculate the first white balance correction value corresponding to flash light from the first image data captured while the flash light is emitted;
  second calculation unit configured to calculate the second white balance correction value corresponding to external light from the second image data captured while the flash light is not emitted.

3. The image processing apparatus a according to claim 1, wherein the combining ratio calculation unit calculates a combining ratio of each pixel by interpolation processing.

4. The image processing apparatus according to claim 1, wherein the combining unit selectively combines the first developed image data and the second developed image data at a block based on a luminance value satisfying a predetermined condition.

5. The image processing apparatus according to claim 2, wherein the second calculation unit calculates the second white balance correction value so as to maintain a tint of a light source.

6. The image processing apparatus according to claim 2, wherein the second calculation unit corrects the second white balance correction value according to an imaging drive mode.

7. The image processing apparatus according to claim 2, further comprising a third calculation unit configured to calculate a mixture ratio of the first and second white balance correction values from the ratio of flash light to external light projected onto an object contained in the first image data in a case where a difference between the first white balance correction value and the second white balance correction value is equal to or smaller than a predetermined value, and calculate a third white balance correction value from the first white balance correction value and the second white balance correction value based on the calculated mixture ratio, wherein the correction unit generates third developed image data with use of the third white balance correction value calculated by the third calculation unit.

8. The image processing apparatus according to claim 2, further comprising a third calculation unit configured to calculate a mixture ratio of the white balance correction values from the ratio of flash light to external light projected onto an object in a case where the object in the first image data is moving, and calculate a third white balance correction value from the first white balance correction value and the second white balance correction value based on the calculated mixture ratio, wherein the correction unit generates third developed image data with use of the third white balance correction value calculated by the third calculation unit.

9. The image processing apparatus according to claim 2, further comprising a third calculation unit configured to calculate a mixture ratio of the white balance correction values from the ratio of flash light to external light projected onto an object in a case where a distance to the object in the first image data is larger than a predetermined amount, and calculate a third white balance correction value from the first white balance correction value and the second white balance correction value based on the calculated mixture ratio, wherein the correction unit generates third developed image data with use of the third white balance correction value calculated by the third calculation unit.

10. An image processing method comprising:

first calculation of calculating a white balance correction value corresponding to flash light from first image data captured while the flash light is emitted;

second calculation of calculating a white balance correction value corresponding to external light from second image data captured while the flash light is not emitted, generating, from first image data captured while the flash light is emitted, first developed image data by correcting the first image data with use of a first white balance correction value corresponding to flash light, and second developed image data by correcting the first image data with use of a second white balance correction value corresponding to external light;

dividing the first image data into a plurality of blocks;

calculating a flash component and an external light component of each of the divided blocks from a luminance value of the first image data and a luminance value of second image data captured while flash light is not emitted, and calculating a combining ratio for each of the blocks based on the calculated flash component and external light component of each of the blocks; and combining the first developed image data and the second developed image data generated by the correcting according to the calculated combining ratio.

11. The image processing method according to claim 10, further comprising:

calculating the first white balance correction value corresponding to flash light from the first image data captured while the flash light is emitted; and calculating the second white balance correction value corresponding to external light from the second image data captured while the flash light is not emitted.

12. A non-transitory computer-readable storage medium that stores a program comprising instruction which, when executed by a computer, cause the computer to perform the method of claim 10.

* * * * *